United States Patent
Reibling et al.

(10) Patent No.: US 10,479,328 B2
(45) Date of Patent: Nov. 19, 2019

(54) SYSTEM AND METHODS FOR ASSESSING THE INTERIOR OF AN AUTONOMOUS VEHICLE

(71) Applicant: Ford Global Technologies, LLC, Dearborn, MI (US)

(72) Inventors: Michael E Reibling, Sterling Heights, MI (US); Ramzi Ahmad Chraim, Dearborn, MI (US); Steven Michael Cyr, Lake Orion, MI (US); Ray C. Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 21 days.

(21) Appl. No.: 15/343,726

(22) Filed: Nov. 4, 2016

(65) Prior Publication Data

US 2018/0126960 A1  May 10, 2018

(51) Int. Cl.
| | | |
|---|---|---|
| *B60S 1/64* | (2006.01) | |
| *G05D 1/00* | (2006.01) | |
| *G05D 1/02* | (2006.01) | |
| *B60S 3/00* | (2006.01) | |
| *G06Q 10/00* | (2012.01) | |
| *G06Q 50/30* | (2012.01) | |

(52) U.S. Cl.
CPC ............. *B60S 1/64* (2013.01); *B60S 3/008* (2013.01); *G05D 1/0088* (2013.01); *G05D 1/021* (2013.01); *G06Q 10/20* (2013.01); *G06Q 50/30* (2013.01)

(58) Field of Classification Search
CPC .................................................. G05D 1/0088
See application file for complete search history.

(56) References Cited

U.S. PATENT DOCUMENTS

| 6,170,318 | B1 | 1/2001 | lewis | |
|---|---|---|---|---|
| 2012/0103367 | A1* | 5/2012 | Tang | A47L 9/2805 134/18 |
| 2012/0136196 | A1* | 5/2012 | Foxall | A61B 5/055 600/21 |
| 2012/0310515 | A1* | 12/2012 | Kirshon | F02N 11/0822 701/112 |

(Continued)

FOREIGN PATENT DOCUMENTS

| CN | 202102521 U | 1/2012 |
|---|---|---|
| CN | 107185313 | 9/2017 |

(Continued)

*Primary Examiner* — Imran K Mustafa
(74) *Attorney, Agent, or Firm* — David R. Stevens; Stevens Law Group

(57) ABSTRACT

An autonomous vehicle includes interior sensors including a camera, IR camera, electro-chemical sensor, humidity sensor, and temperature sensor. Initial and final outputs of these sensors are captured for a trip conveying one or more passengers. If changes in the outputs of the sensors are detected, whether the final outputs of the sensors are acceptable may be evaluated. In some embodiments, an aggregation of the outputs is evaluated and found unacceptable even where individual outputs are acceptable. Outputs may be presented to a dispatcher to confirm that the outputs are unacceptable. If the outputs are found to be unacceptable, the vehicle may be autonomously driven to a cleaning station. Personal items may be identified in camera outputs and alerts generated in response.

13 Claims, 8 Drawing Sheets

(56) References Cited

U.S. PATENT DOCUMENTS

| | | |
|---|---|---|
| 2013/0204798 A1 | 8/2013 | Gabrysch |
| 2014/0222298 A1* | 8/2014 | Gurin ...................... G06F 17/00 |
| | | 701/49 |
| 2015/0077737 A1* | 3/2015 | Belinsky ............ G01N 15/0211 |
| | | 356/51 |
| 2015/0287130 A1 | 10/2015 | Vercollone |
| 2017/0080900 A1* | 3/2017 | Huennekens ........... B60R 25/31 |
| 2017/0210352 A1 | 7/2017 | Stauffer |

FOREIGN PATENT DOCUMENTS

| | | |
|---|---|---|
| DE | 10254496 A1 | 6/2004 |
| DE | 102005006312 A1 | 8/2006 |
| DE | 102017101508 | 7/2017 |
| DE | 102016215525 | 2/2018 |
| GB | 2549192 | 10/2017 |

\* cited by examiner

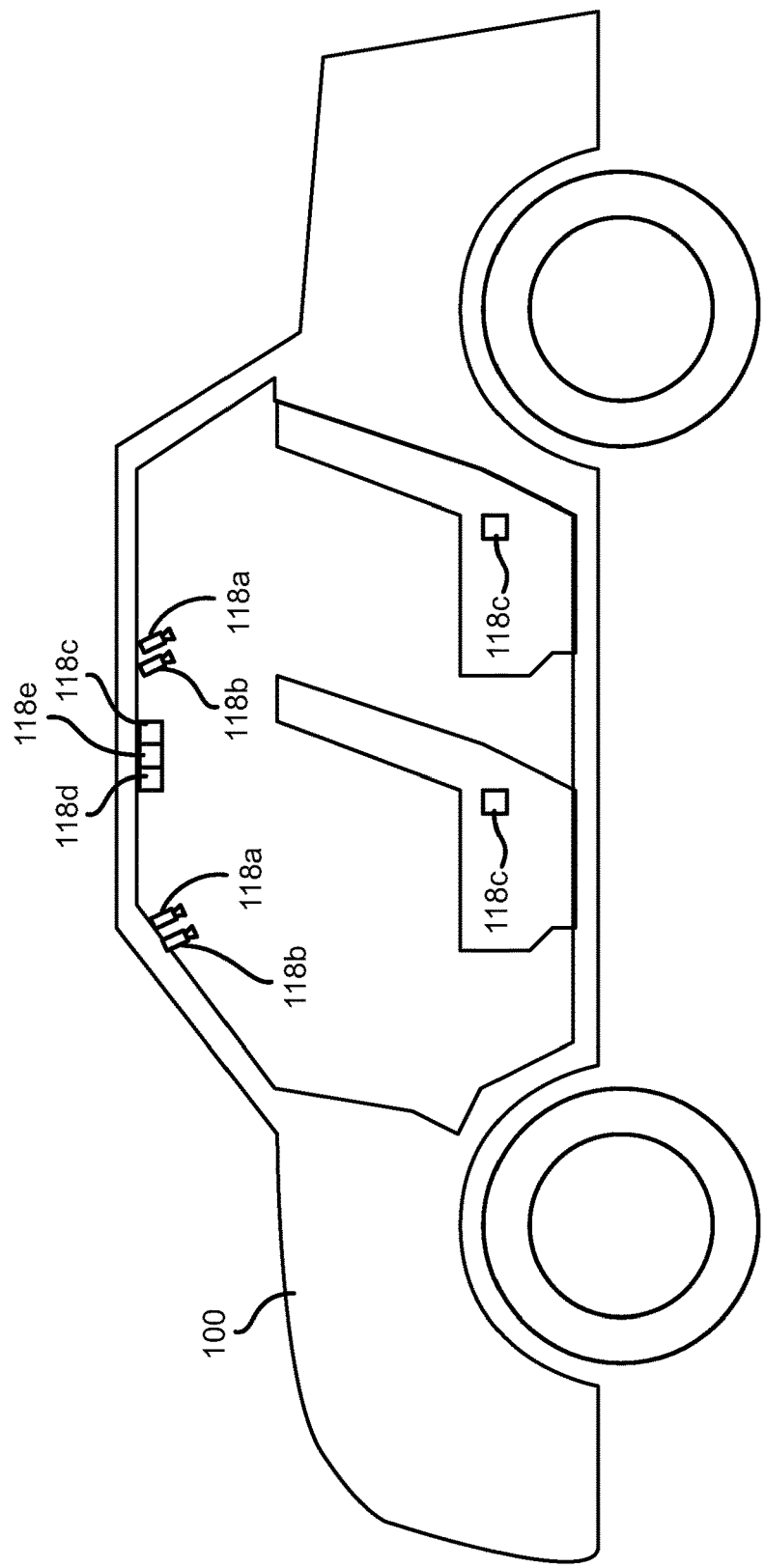

SYSTEM AND METHODS FOR ASSESSING THE INTERIOR OF AN AUTONOMOUS VEHICLE

BACKGROUND

Field of the Invention

This invention relates to a sensor system and method for an autonomous vehicle.

Background of the Invention

Autonomous vehicles are the subject of much research and development. Such vehicles include a set of sensors and control logic that enables the identification and avoidance of obstacles and navigation to a destination. One application of autonomous vehicles is use as taxis that can pick up a passenger on demand.

The system and methods disclosed herein provide an approach for providing autonomous taxi services.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1B is a schematic block diagram of a vehicle including interior sensors for implementing embodiments of the invention;

DETAILED DESCRIPTION

Figure 1A:
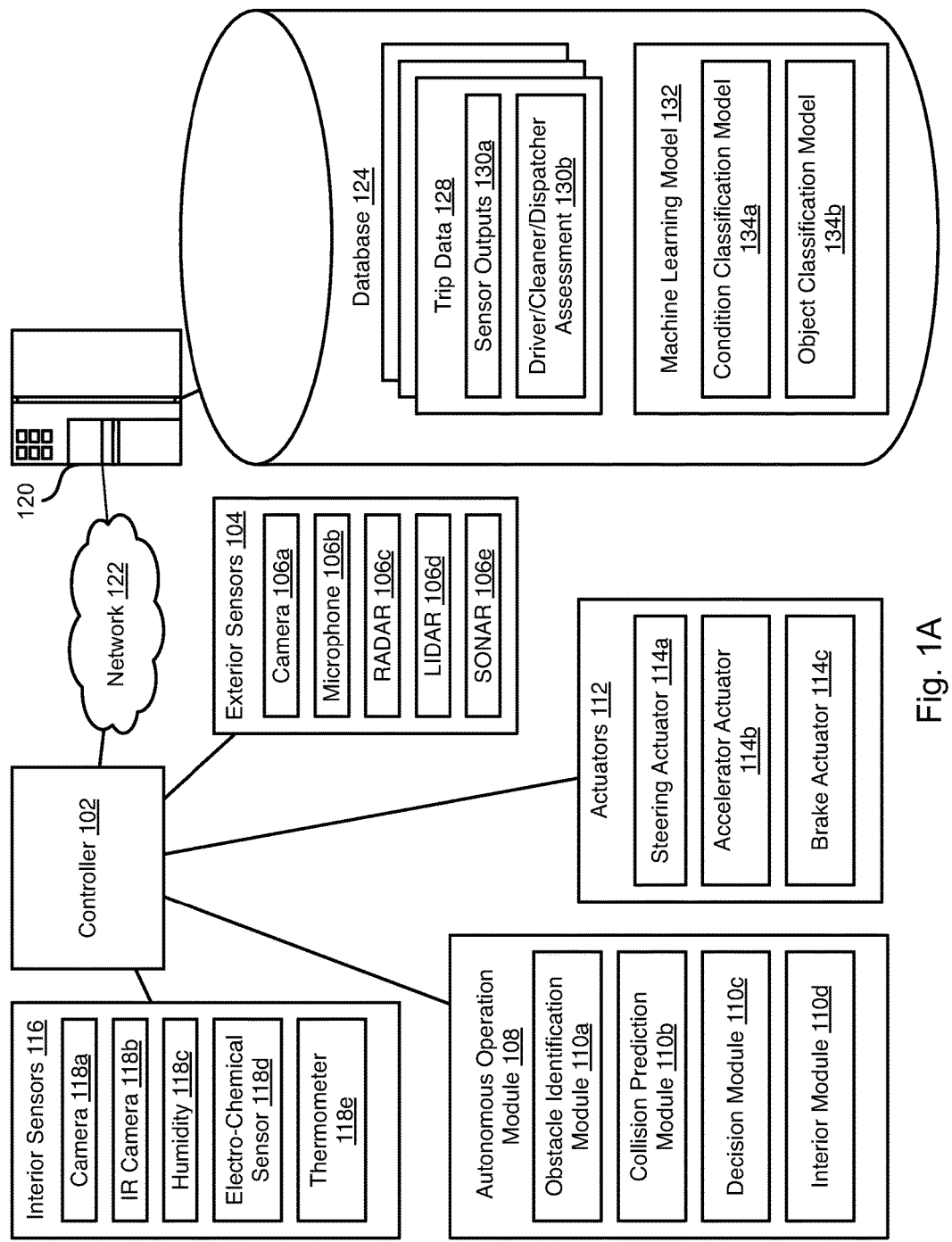
FIG. 1A is a schematic block diagram of a system for implementing embodiments of the invention.

Referring to FIGS. 1A and 1B, a vehicle 100 (see FIG. 1B) may house a controller 102. The vehicle 100 may include any vehicle known in the art. The vehicle 100 may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. The controller 102 may receive one or more outputs from one or more exterior sensors 104. For example, one or more cameras 106a may be mounted to the vehicle 100 and output image streams received to the controller 102. The controller 102 may receive one or more audio streams from one or more microphones 106b. For example, one or more microphones 106b or microphone arrays 106b may be mounted to the vehicle 100 and output audio streams to the controller 102. The microphones 106b may include directional microphones having a sensitivity that varies with angle.

The exterior sensors 104 may include sensors such as RADAR (Radio Detection and Ranging) 106c, LIDAR (Light Detection and Ranging) 106d, SONAR (Sound Navigation and Ranging) 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art.

The autonomous operation module 108 may further include an interior module 110d that evaluates a state of the interior of the vehicle 100 according to the methods disclosed herein. The interior module 110d may evaluate outputs of one or more interior sensors 116. The interior sensors 116 may include one or more cameras 118a, i.e. a visible light camera such as a still image or video camera. The interior sensors 116 may also include one or more infrared (IR) cameras 118b, one or more humidity sensors 118c, an electro-chemical sensor 118d, and an electronic thermometer 118e.

As shown in FIG. 1B, one or more cameras 118a may be positioned and oriented in the vehicle to have all seating surfaces (seat bottoms and seat backs) in the field of view of at least one of the cameras 118a. Other areas of the interior of the vehicle may also be in the field of at least one of the cameras 118a.

One or more IR cameras 118b may be positioned and oriented in the vehicle to have all seating surfaces (seat bottoms and seat backs) in the field of view of at least one of the IR cameras 118b. Other areas of the interior of the vehicle may also be in the field of at least one of the IR cameras 118b.

The humidity sensor 118c, electro-chemical sensor 118d, and thermometer 118e may be positioned at any position in the vehicle interior. In order to more readily detect spills, the humidity sensor 118c may be embedded in seats of the vehicle. Alternatively, the humidity sensor 118c may be mounted on the ceiling of the interior or elsewhere. The electro-chemical sensor 118d and thermometer 118e may be mounted on the ceiling or elsewhere in the interior.

The electro-chemical sensor 118d may include any electro-chemical sensor known in the art and may detect various organic components, volatile chemicals, and any other chemical sensible using any electro-chemical sensor known in the art.

The controller 102 may be in data communication with a server 120, such as by means of a network 122 that may include any wired or wireless network connection, including a cellular data network connection. The methods disclosed herein may be implemented by the server 120, the controller 102, or a combination of the two.

The server system 120 may host or access a database 124. The database may include trip data 128. Trip data 128 may include outputs 130a of the interior sensors 116 captured for each trip performed by the autonomous vehicle housing the controller 102, i.e. each time the vehicle navigates to a pick up location to pick up one or more passengers and then deposits the passengers at a destination. The trip data 128 may include sensor outputs 130a captured prior to pick up and after deposit, and optionally during transport. In some embodiments, to protect passenger privacy, only outputs 130a captured before pick up and after deposit are included in the trip data 128 for a trip.

The trip data 128 may further include an assessment 130b of the interior of the vehicle by a human, e.g. the next passenger to use the vehicle after the trip, a cleaner who cleaned the vehicle immediately following a trip, a dispatcher or other worker who performs an evaluation of the interior of the vehicle immediately following a trip. The evaluation may be a binary score (acceptable/unacceptable), a list of problems (items found, list of stained areas, odors detected, or the like.

The database 124 may also store a machine learning model 132 that is trained according to the trip data 128. The machine learning model 132 may be a deep neural network, decision tree, clustering, Bayesian network, or other type of machine learning model.

For example, a condition classification model 134a may be trained using each trip data record 128 as training data point where the before and after sensor outputs 130a are the input and the assessment 130b is the desired output. The condition classification model 134a may then be trained to provide an estimated assessment (e.g., acceptable, unacceptable, a condition rating, or the like) for a given a set of before and after sensor outputs.

In some embodiments, the machine learning model 132 may also include an object classification model 134b that identifies objects in an image. Such a model 132 may be trained by inputting images from the outputs of the camera 118a and a list of items identified in the assessment 130b for those outputs as the desired output.

Figure 2:
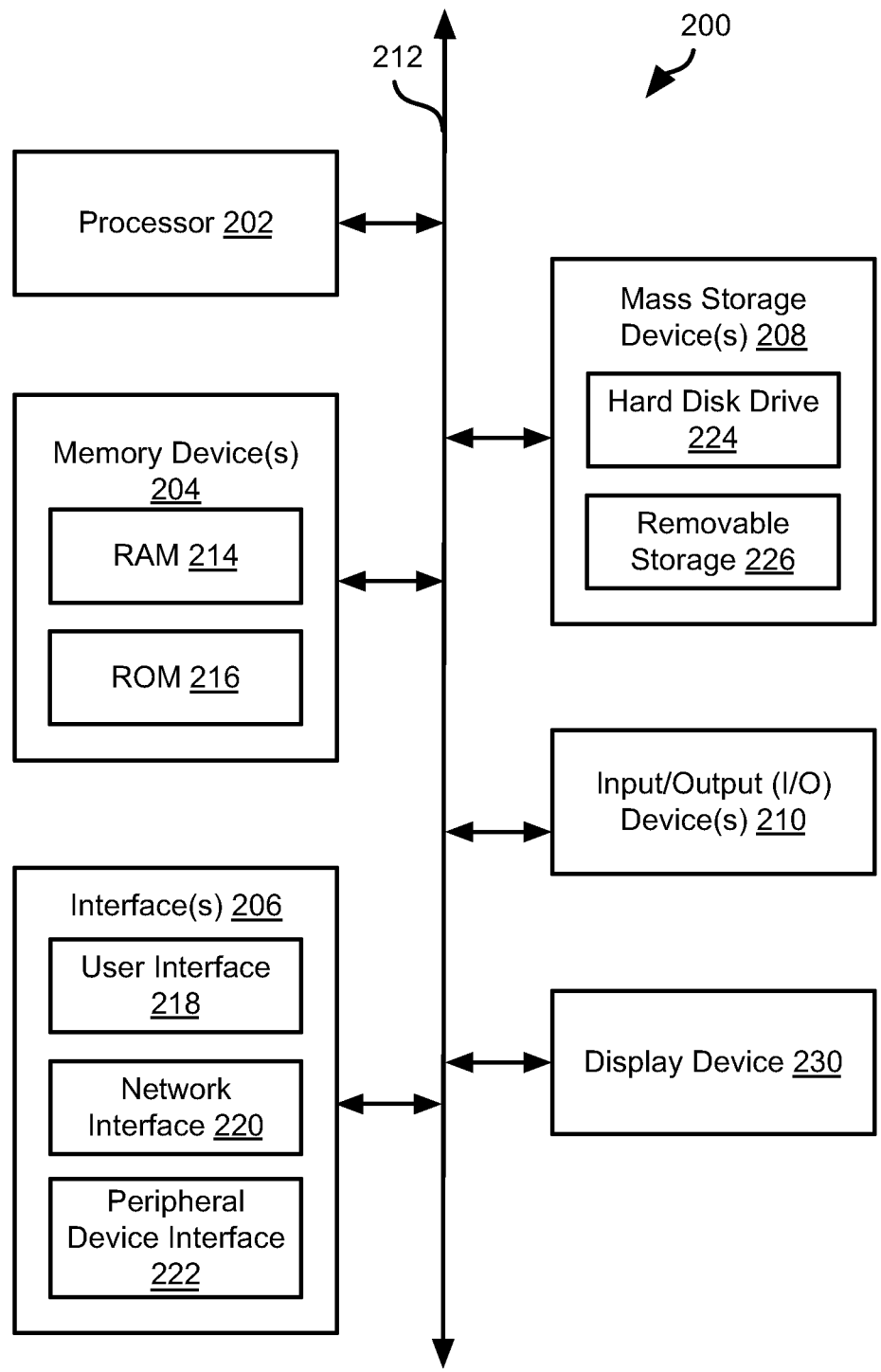
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 and server system 120 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
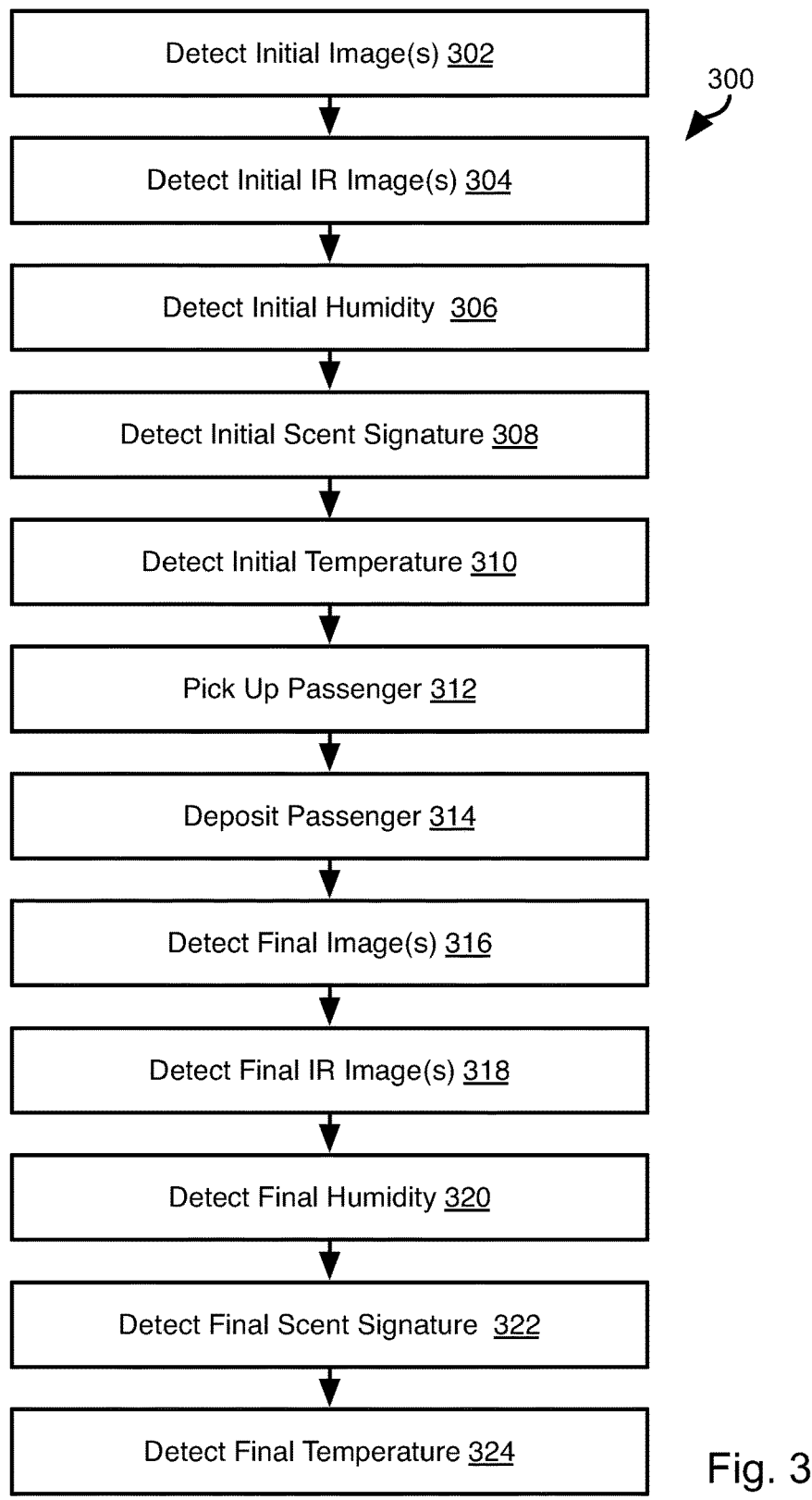
FIG. 3 is a process flow diagram of a method for evaluating a state of an autonomous taxi in accordance with an embodiment of the present invention.

Referring to FIG. 3, the illustrated method 300 may be used to obtain data from the interior sensors 116 in order to evaluate the condition of the interior of the vehicle 100. The method 300 may be performed by the controller 102, the server system 120, or be divided among these devices.

The method 300 may include some or all of detecting 302 one or more initial images of the interior of the vehicle using the one or more cameras 118*a*; detecting 304 one or more initial IR images using one or more IR cameras 118*b*; detecting 306 an initial humidity using one or more humidity sensors 118*c*; detecting 308 an initial scent signature using the electro-chemical sensor 188*d*; and detecting 310 an initial temperature using the electronic thermometer 118*e*.

The measurements of steps 302-310 may be taken just prior to picking up one or more passengers at a trip, e.g. at a pick up location prior to the one or more passengers entering the vehicle, prior to departure from a dispatching area, at a cleaning station following cleaning or inspection, or after dropping of passengers from a preceding trip.

The sensor outputs of steps 302-310 may be stored by the controller 102 and may additionally or alternatively be transmitted to the server system 120, which may store them in a trip data record 128.

The controller 100 may then pick up 312 one or more passengers, navigate to a destination, and deposit 314 the one or more passengers at the destination The method 300 may then include detecting 316-324 final images, final IR images, final humidity, final scent signature, and final temperature in the same manner as for steps 302-310. Steps 316-324 may be performed immediately after depositing 314 the one or more passengers. For example, in response to detecting closing of one or more doors of the vehicle 100 following stopping at the destination.

The sensor outputs of steps 316-324 may be stored by the controller 102 locally and may additionally or alternatively transmitted to the server system 120.

Figure 4A:
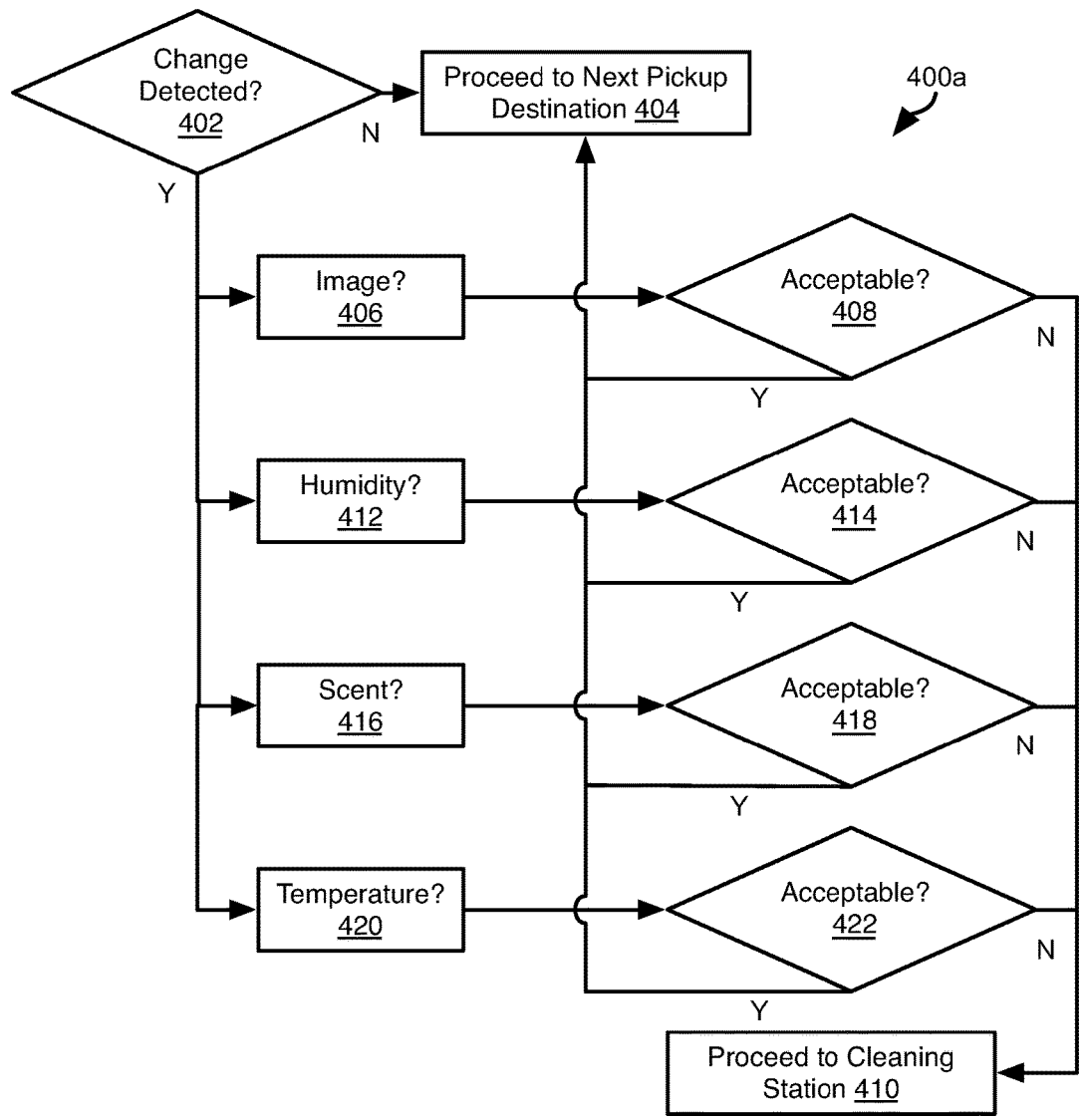
FIGS. 4A to 4C are process flow diagrams of methods for processing outputs of interior sensors in accordance with embodiments of the present invention.
Figure 4B:
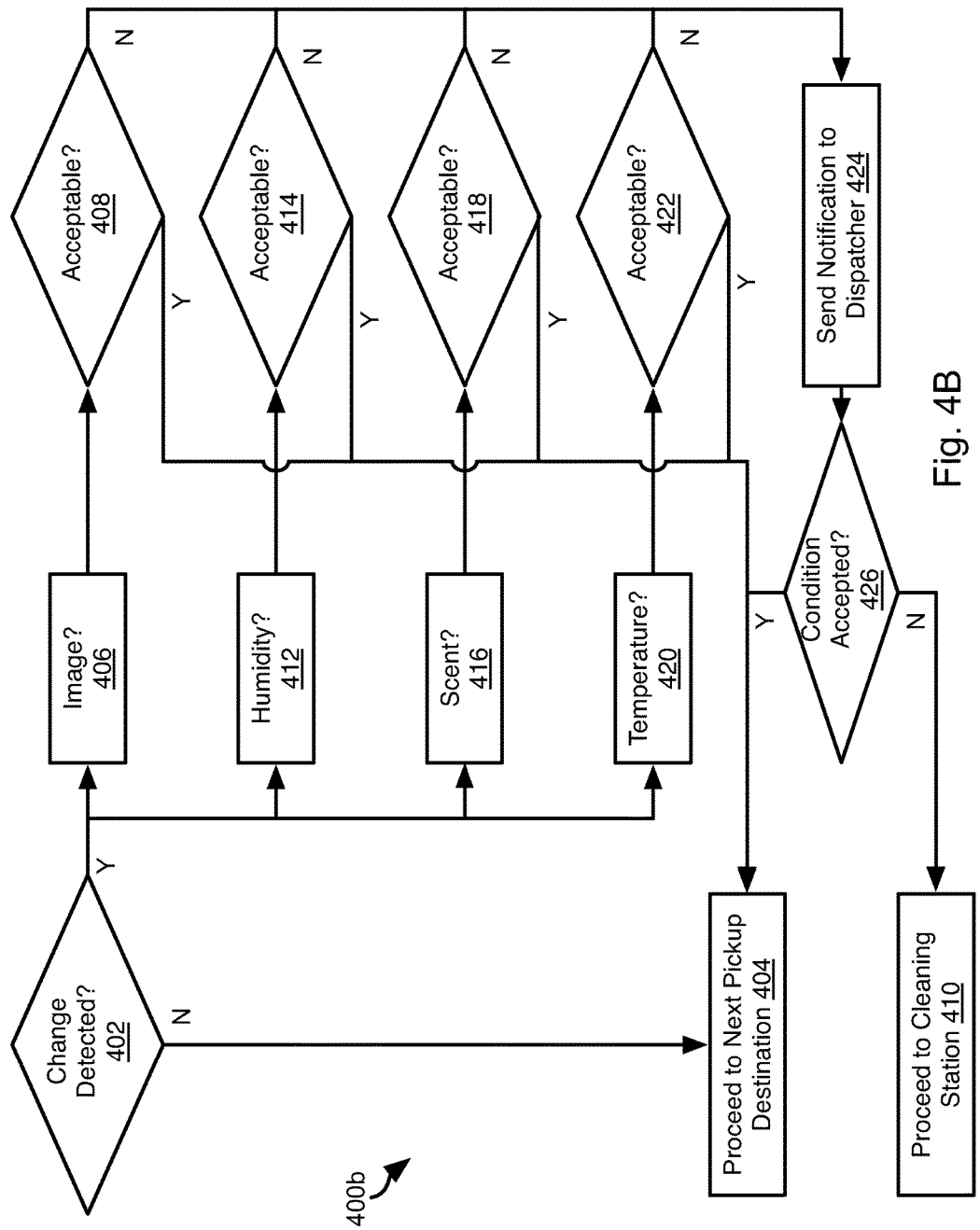
Figure 4C:
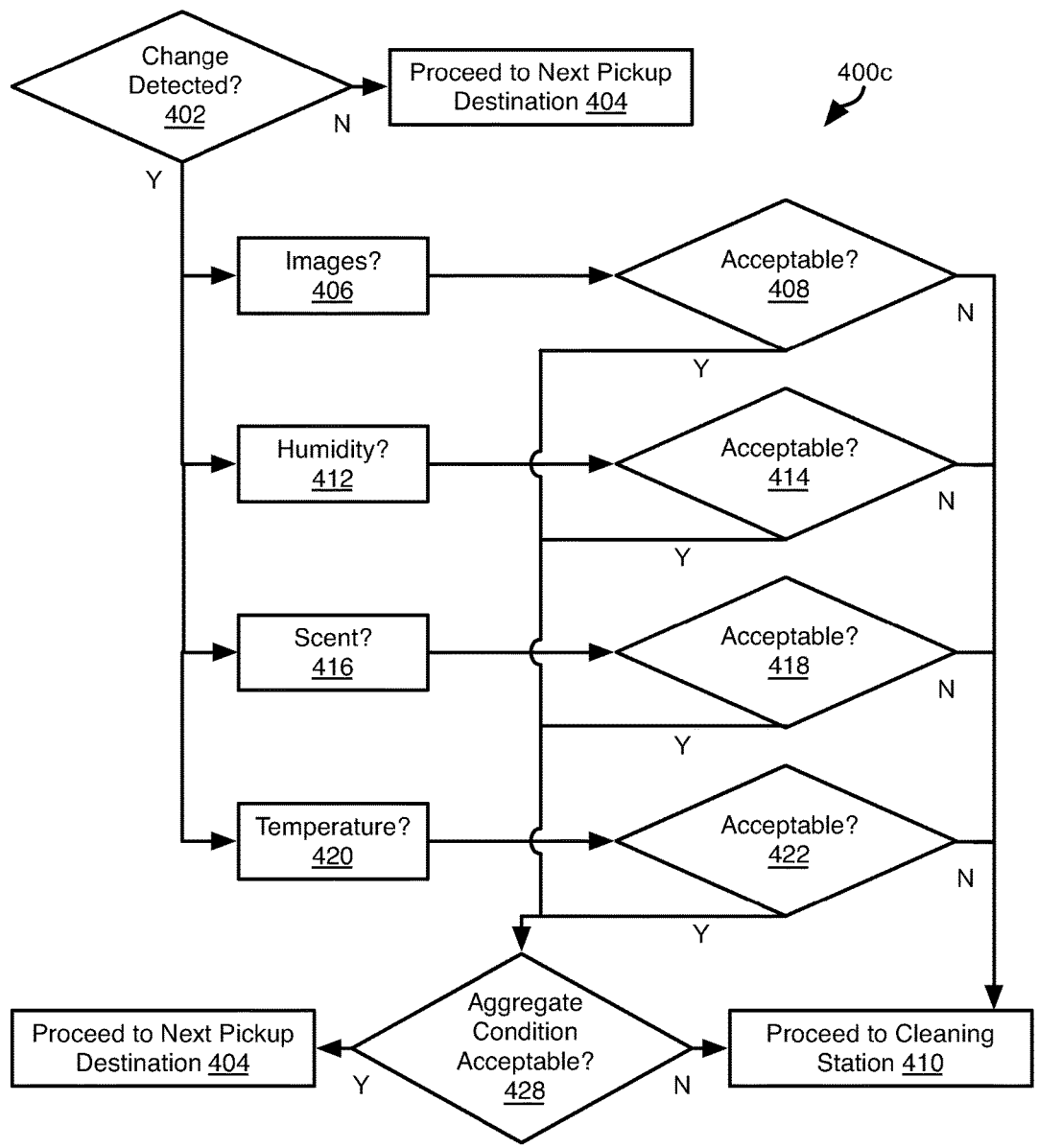

In FIGS. 4A to 4C, the illustrated methods 400*a*-400*c* may be used to evaluate the sensor outputs obtained according to the method 300. The methods 400*a*-400*c* may be executed by the server system 120 based on measurements obtained by the controller 102 during execution of the method 300 and transmitted to the server system 120. Alternatively, the methods 400*a*-400*c* may be executed by the controller 102.

Referring to FIG. 4A, the method 400*a* may include detecting 402 whether there has been a change in the outputs of the interior sensors 116. This may include evaluating outputs of the interior sensors from steps 302-310 with respect to those from steps 316-324. For the initial and final images and IR images, this may include comparing the images and detecting variation in the pixels of the images. A change may be detected where the aggregate change for the before and after images exceeds a threshold. For example, the final image having a number of pixels that have difference in value that exceeds some value threshold with the number of pixels exceeding some area threshold. Differences between the initial and final IR images may be determined in a similar manner. Any metric of image similarity may be used to determine whether a significant change is present between the initial and final images and IR images.

For the humidity and temperature measurements, the initial and final measurements may be compared and the difference compared to a threshold. If the difference exceeds the threshold, a change may be detected 402.

For the scent signature, an array of values may be included in the initial and final scent signatures. Accordingly, change may be detected 402 where the average change for each value between the initial and final scent signatures may be compared to a scent threshold to determine 402 whether a change has occurred.

If no change is detected 402, then the controller 102 may cause the vehicle to proceed 404 to a next pick up destination.

If a change is detected 402, then the method 400*a* may include evaluating whether the change in the initial and final measurements are acceptable for those sensor outputs in which the change was detected.

As shown, if a final image (taken with the camera 118*a* or IR camera 118*b*) is found 406 to have changed, this change may be evaluated 408 to determine whether it is acceptable. This may include identifying and classifying objects (e.g., litter and personal items) in the final and possibly initial image, identifying additional stains or markings in the final image, or identifying other features in the initial and final images.

For the IR image, the thermal signature of a spilled hot drink will be visible even if not apparent in the visible images, i.e. the image taken with the visible light camera 118*a*. Likewise, areas soaked with other liquid may also appear cooler than surrounding areas due to evaporation or the liquid being previously chilled.

Determining 408 whether a change between the initial and final images may be determined by evaluating an aggregation in differences between initial and final visible and IR images. For example, the sum of all differences between the pixels of the initial and final images for both types of cameras may be compared to a threshold, which may be unique to each type of camera. Alternatively, a metric of differences between the initial and final images and a metric of the differences between the initial and final IR images maybe combined and this combined metric may be compared to a single threshold. In some embodiments, differences between the initial and final IR images may weighted before combining with the differences between the initial and final visible images.

If individual thresholds for the different types of images or the threshold for the combined metrics is exceeded, the change may be determined 408 not to be acceptable; otherwise the change will be determined 408 to be acceptable.

Any technique known in the art of image analysis may be used to compare the initial and final visible and IR images. Accordingly, the similarity or difference metric according to any of these techniques may be evaluated with respect to a threshold condition at step 408 to determine whether the change is acceptable.

In some embodiments, whether the initial and final visible and IR images are acceptable or not may be determined 408 by inputting these images into the machine learning model 132, which is trained to provide an output indicating whether the images indicate an acceptable or unacceptable condition as described above with respect to FIG. 1.

If the images are found 408 not to be acceptable, then the controller 102 may cause the vehicle 100 to proceed 410 to a nearest cleaning station, dispatching area, or other location where the condition of the vehicle may be assessed and/or remediated.

Alternatively, step 410 for the methods 400*a*-400*c* may include other actions such as sending a car and/or cleaner to the location of the vehicle 100, sending a replacement vehicle to a next pick up location for the vehicle 100, or other actions.

If the humidity is found 412 to have changed by some minimum amount, the method 400*a* may include evaluating 414 whether the humidity is acceptable. This may include comparing the change between the final and initial humidity with respect to a humidity change threshold and/or comparing the final humidity to a humidity threshold. If the change in humidity and/or the final humidity exceeds one of the corresponding thresholds, the humidity may be found 414 to be unacceptable.

If the humidity is found 414 not to be acceptable, then the controller 102 may cause the vehicle 100 to proceed 410 to a nearest cleaning station, dispatching area, or other location where the condition of the vehicle may be assessed and/or remediated.

If the initial and final scent signatures are found 416 to indicate a change, then the method 400*a* may include evaluating 418 whether the change is acceptable. The scent signature may indicate detected concentrations of various chemicals or types of chemicals. Accordingly, whether the scent signature has changed may include determining 416 whether any of these measured concentrations has changed by an above-threshold amount, or whether an aggregate change in concentration for some or all of the measured chemicals exceeds an aggregate change threshold.

Likewise, whether the change is found to be acceptable 418 may include whether concentration of an individual chemical has changed by an above-threshold amount or whether an aggregate change in measured concentrations meets an aggregate threshold.

Some compounds are more offensive then others. Accordingly, the threshold for certain chemicals may be lower than for others. Where an aggregate threshold is used, concentrations for some chemicals may be weighted more than others when computing the aggregate change. As for humidity, an absolute value, rather than a change in value, for one or more chemicals may be found 418 to be unacceptable if the absolute value exceeds a threshold for that chemical.

In some embodiments, whether the initial and final scent signatures are acceptable or not may be determined 418 by inputting these images into the machine learning model 132, which is trained to provide an output indicating whether the scent signatures indicate an acceptable or unacceptable condition as described above with respect to FIG. 1.

If the final scent signatures is found 418 not to be acceptable, then the controller 102 may cause the vehicle 100 to proceed 410 to a nearest cleaning station, dispatching area, or other location where the condition of the vehicle may be assessed and/or remediated.

If the temperature is found 420 to have changed by some minimum amount, the method 400*a* may include evaluating 422 whether the temperature is acceptable. This may include comparing the change between the final and initial temperature with respect to a temperature change threshold and/or comparing the final temperature to a temperature threshold. If the change in temperature and/or the final temperature exceeds one of the corresponding thresholds, the temperature may be found 410 to be unacceptable.

If the temperature is found 422 not to be acceptable, then the controller 102 may cause the vehicle 100 to proceed 410 to a nearest cleaning station, dispatching area, or other location where the condition of the vehicle may be assessed and/or remediated.

If none of the images, humidity measurements, scent measurements, and temperature are found to be unacceptable, then the controller 102 may cause the vehicle to proceed 404 to the next pickup location.

Note that humidity, scent, and temperature relate to properties of air within the vehicle 100. Accordingly, if the result of steps 404, 418, and 422 is negative, i.e. found unacceptable, the method 400*a* may include turning on the ventilation system of the vehicle 100 for a period, e.g., 5 minutes, or until the result of steps 414, 418, 422 are positive. After this period, the conditions of steps 414, 418, 422 may be reevaluated. If the result is still negative, then step 410 will be executed. Otherwise, step 404 will be executed.

Referring to FIG. 4B, in an alternative method 400*b*, steps 402-422 may be executed in the same manner as for the method 400*a*. However, rather than performing steps 410 automatically, human judgment may be incorporated. For example, if the results of the evaluations of any of steps 408, 414, 418, and 422 is negative, i.e., unacceptable, then a notification is transmitted 424 to a dispatcher or other representative. The notification may include the initial and final sensor outputs or a representation thereof for review by the dispatcher. These outputs or the representation may then be displayed on a display device for the dispatcher. If the dispatcher is found 426 to provide an input indicating that the condition of the vehicle is acceptable, then step 404 is executed. Otherwise, step 410 is executed.

Although FIGS. 4A and 4B illustrate discrete evaluations of the initial and final outputs of each interior sensor 116, in other embodiments, the evaluations may be combined. For example, the initial and final outputs for each interior sensor 116 may be input to the machine learning model 132, which then outputs an acceptable or unacceptable decision.

As known in the art, many machine learning models will output a confidence score for an output provided by the machine learning model. In some embodiments step 424 may be executed where this confidence score is below some threshold indicating that human input is needed. As noted above with respect to FIG. 1, each determination of the dispatcher of acceptability or unacceptability in combination with the sensor outputs that are the basis of that determination become trip data 128 that is then used to further train the machine learning model 132.

Referring to FIG. 4C, in an alternative method 400*c*, steps 402-422 may be executed in the same manner as for the method 400*a*. However, in the event that sensor outputs are found 406, 412, 416, 420 to have changed and all these changed outputs are found 408, 414, 418, 422 to be acceptable, an additional step 428 may evaluate the aggregate values of the initial and final outputs. In particular, even where individually no sensor output is found 408, 414, 418, 422 to be unacceptable, the aggregate outputs may be found 428 to be unacceptable.

For example, sensor outputs, or a score based on the sensor outputs may be summed or weighted and summed to derive a final score. This score may then be compared to a threshold. If the final score exceeds the threshold, then step 410 may be executed. Otherwise, step 404 is executed.

The evaluation 428 may be performed by inputting the sensor outputs to the machine learning model 132 in the same manner as described above with respect to FIGS. 4A and 4B.

Figure 5:
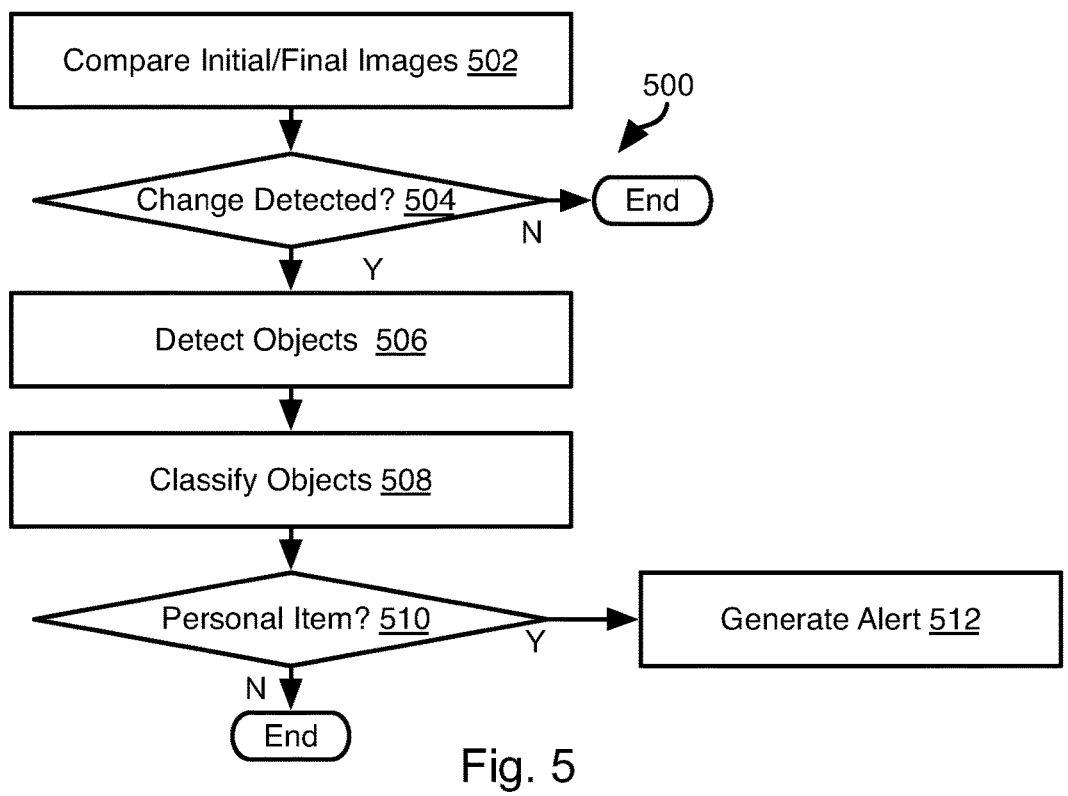
FIG. 5 is a process flow diagram of a method for detecting objects in an autonomous taxi in accordance with an embodiment of the present invention.

Referring to FIG. 5, as noted above the machine learning model 132 may include an object classification model 134*b*. This may be used to identify litter, stains, etc. in a vehicle that needs to be removed. However, the object classification model 134*b* may also be trained to identify personal belongings such as purses, wallets, cell phones, jewelry, etc.

Accordingly the method 500 of FIG. 5 may be executed in combination with any of the methods 400*a*-400*c* in order to determine whether a passenger as left behind personal belongings.

The method 500 may include comparing 502 initial and final images, which may include comparing initial and final visible images and possibly the initial and final IR images and determining 504 whether there is a significant change between the initial and final images. This may be performed in the same manner as for step 406 described above.

If a change is found 504 to have been detected, the method 500 may include detecting 506 and classifying objects 508 by inputting the images to the object classification model 134*b*. If the classification of one or more detected objects is found 510 to be a personal item (cell phone, purse, wallet, jewelry, clothing, etc.), then an alert is generated 512. Generating 512 an alert may include transmitting a notification to one or both of the most recent passenger and the dispatcher. Step 512 may include driving the vehicle to a cleaning station where the personal item may be retrieved and held for the passenger.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for a vehicle comprising:
a plurality of sensors each sensing a different property of an interior of the vehicle, the plurality of sensors including all of a visible light camera, an infrared (IR) camera, and an electrochemical sensor;
a controller coupled to the plurality of interior sensors and programmed to—
receive a first output for each sensor of the plurality of sensors;
receive a second output for each sensor of the plurality of sensors after receiving the first output for each sensor of the plurality of sensors;
for each sensor of the plurality of sensors—
calculate a change value that is a change between the first output and the second output for the each sensor; and
when the change value meets a threshold condition corresponding to the each sensor, invoke cleaning of the interior;
calculate an aggregate change as one of a sum and a weighted sum of the change values for the plurality of sensors;
compare the aggregate change to an aggregate threshold condition; and
when the aggregate change between the first outputs and the second outputs exceeds the aggregate threshold condition and the change value for each of the sensors of the plurality of sensors does not meet the threshold corresponding to the each sensor, invoke cleaning of the interior.

2. The system of claim 1, wherein the plurality of sensors include a humidity sensor.

3. The system of claim 2, wherein the controller is further programmed to, if the change between the first and second outputs of at least one of the electro-chemical sensor and humidity sensor meet a corresponding threshold conditions:
activate a ventilation system of the vehicle;
again measure outputs of the at least one of the electro-chemical sensor and humidity sensor; and
if the outputs of the at least one of the electro-chemical sensor and humidity sensor still meet the corresponding threshold conditions, invoking cleaning of the interior.

4. The system of claim 2, wherein the controller is programmed to determine if the aggregate change between the second outputs and the first outputs meets the threshold condition by inputting the first outputs and second outputs into a machine learning model.

5. The system of claim 1, wherein the controller is programmed to invoke cleaning of the interior comprises autonomously driving the vehicle to a cleaning station.

6. The system of claim 5, wherein the controller is programmed to, if an aggregate change between the second outputs and the first outputs does not meet a threshold condition, autonomously driving the vehicle to a pick up location without first autonomously driving the vehicle to any cleaning station.

7. A method for evaluating a vehicle, the method comprising:
providing a plurality of sensors each sensing a different property of an interior of the vehicle, the plurality of sensors including all of a visible light camera, an infrared (IR) camera, and an electrochemical sensor;
receiving, by a controller coupled to the plurality of interior sensors, first outputs from the plurality of interior sensors;
receiving, by the controller, second outputs from the plurality of sensors after a trip in the vehicle by a passenger subsequent to receiving the first outputs;
calculating, by the controller, for each sensor of the plurality of sensors, a change value that is a change between the first output and the second output for the each sensor;
calculating, by the controller, an aggregate change as a weighted sum of the change values for the plurality of sensors;
comparing the aggregate change to a threshold condition;
determining, by the controller, that the aggregate change exceeds the threshold condition;
in response to determining that the aggregate change between the second outputs and the first outputs exceeds the threshold condition invoking, by the controller, cleaning of the interior.

8. The method of claim 7, wherein the plurality of sensors include a humidity sensor.

9. The method of claim 8, wherein the threshold condition is a first threshold condition;
wherein the method further comprises:
receiving, by the controller, third outputs of the plurality of sensors;
receiving, by the controller, fourth outputs of the plurality of sensors after receiving the third outputs;
determining, by the controller, that a change between the third and fourth outputs of any one of the camera, IR camera, electro-chemical sensor, and humidity sensor meets a corresponding threshold condition;
in response to determining that the change between the third and fourth outputs of any one of the camera, IR camera, electro-chemical sensor, and humidity sensor meets the corresponding threshold condition, invoking, by the controller, cleaning of the interior.

10. The method of claim 8, further comprising:
determining outputs of at least one of the electro-chemical sensor and humidity sensor meet a corresponding threshold conditions;
in response to determining that outputs of at least one of the electro-chemical sensor and humidity sensor meets the corresponding threshold condition—
activating, by the controller, a ventilation system of the vehicle;
again measuring, by the controller, the outputs of the at least one of the electro-chemical sensor and humidity sensor; and determining, by the controller, that the outputs of the at least one of the electro-chemical sensor and humidity sensor still meet the corresponding threshold conditions; and in response to determining that the outputs of the at least one of the electro-chemical sensor and humidity sensor still meet the corresponding threshold conditions, invoking cleaning of the interior.

11. The method of claim 8, further comprising determining that the aggregate change between the second outputs and the first outputs meets the threshold condition by inputting the first outputs and second outputs into a machine learning model.

12. The method of claim 7, wherein invoking cleaning of the interior comprises autonomously driving the vehicle to a cleaning station.

13. The method of claim 12, further comprising:

receiving, by the controller, third outputs of the plurality of sensors;

receiving, by the controller, fourth outputs of the plurality of sensors after receiving the third outputs;

determining, by the controller, that an aggregate change between the third outputs and the fourth outputs does not meet the threshold condition; and in response to determining that the aggregate change between the third outputs and the fourth outputs does not meet the threshold condition, autonomously driving, by the controller, the vehicle to a pick up location without driving the vehicle to any cleaning station.

\* \* \* \* \*